(12) United States Patent
Fazel

(10) Patent No.: US 10,114,350 B2
(45) Date of Patent: Oct. 30, 2018

(54) DATA ACQUISITION AND POWER CONTROL PROGRAMMABLE CUSTOMIZABLE COMBINATORIAL TESTING POWER SENSING AND DISPLAY INSTRUMENTATION

(71) Applicant: Kamron C. Fazel, Alexandria, VA (US)

(72) Inventor: Kamron C. Fazel, Alexandria, VA (US)

(73) Assignee: The United States of America, as represented by the Secretary of Navy, Washington, DC (US)

( * ) Notice: Subject to any disclaimer, the term of this patent is extended or adjusted under 35 U.S.C. 154(b) by 509 days.

(21) Appl. No.: 14/613,889

(22) Filed: Feb. 4, 2015

(65) Prior Publication Data

US 2015/0168979 A1 Jun. 18, 2015

Related U.S. Application Data

(63) Continuation-in-part of application No. 14/339,134, filed on Jul. 23, 2014.

(60) Provisional application No. 61/857,237, filed on Jul. 23, 2013.

(51) Int. Cl.
| | | |
|---|---|---|
| G05B 15/02 | (2006.01) | |
| G05F 1/575 | (2006.01) | |
| G05F 1/66 | (2006.01) | |
| G06F 1/26 | (2006.01) | |
| H02M 3/156 | (2006.01) | |
| G05F 1/563 | (2006.01) | |
| G06F 13/42 | (2006.01) | |

(52) U.S. Cl.
CPC ............ *G05B 15/02* (2013.01); *G05F 1/563* (2013.01); *G05F 1/575* (2013.01); *G06F 1/266* (2013.01); *G06F 13/4282* (2013.01)

(58) Field of Classification Search
CPC ..... G05B 15/02; G05F 1/563; G05F 13/4282; G06F 13/4282; G06F 1/266
USPC .......................................... 702/116; 700/297
See application file for complete search history.

(56) References Cited

U.S. PATENT DOCUMENTS

| | | | | |
|---|---|---|---|---|
| 8,674,913 | B2 * | 3/2014 | Knapp | ............. H04L 12/40013 |
| | | | | 345/82 |
| 9,185,822 | B2 * | 11/2015 | Shanbhogue | ........... H05K 1/144 |
| 9,922,535 | B2 * | 3/2018 | Matsuoka | ............ G08B 25/008 |

(Continued)

OTHER PUBLICATIONS

Keithley 2400 SourceMeter SMU Instruments (2013). Retrieved from http://www.tek.com/keithley-source-measure-units/keithley-smu-2400-series-sourcemeter.

(Continued)

*Primary Examiner* — Ly D Pham
(74) *Attorney, Agent, or Firm* — US Naval Research Laboratory; Roy Roberts

(57) ABSTRACT

A method and system for a power supply and data acquisition unit including a power supply component configured to provide a selectable, variable power output to an experiment, wherein the experiment comprises one or more sensors. A sensor interface unit is configured to read a plurality of sensor inputs from the one or more sensors of the experiment. A microcontroller module is configured to provide instructions to the power supply component, and further configured to receive the plurality of sensor inputs from the sensor interface unit and convert the sensor inputs into readable data.

8 Claims, 3 Drawing Sheets

(56) References Cited

U.S. PATENT DOCUMENTS

| | | | | |
|---|---|---|---|---|
| 2005/0154494 A1* | 7/2005 | Ahmed | ............... | G05B 15/02 700/275 |
| 2005/0227575 A1* | 10/2005 | Pierson | ............... | A63H 19/14 446/93 |
| 2006/0005055 A1* | 1/2006 | Potega | ............... | G06F 1/1632 713/300 |
| 2007/0129726 A1* | 6/2007 | Eder | ............... | A61B 18/1442 606/45 |
| 2008/0288201 A1* | 11/2008 | Oettinger | ............ | H02M 3/157 702/109 |
| 2009/0001813 A1* | 1/2009 | Berry | ............... | H02M 1/10 307/31 |
| 2010/0097767 A1* | 4/2010 | Jude | ............... | H05K 7/20409 361/709 |
| 2011/0230837 A1* | 9/2011 | Kamen | ............... | A61M 39/14 604/151 |
| 2012/0163051 A1* | 6/2012 | Vogman | ............. | H02M 1/4208 363/125 |
| 2013/0088092 A1* | 4/2013 | Ladron de Guevara | ............... | H02M 1/4266 307/109 |
| 2013/0182595 A1* | 7/2013 | Shimizu | ............. | H04W 24/00 370/252 |
| 2013/0184840 A1* | 7/2013 | Chin | ............... | H05K 7/1465 700/83 |
| 2014/0356005 A1* | 12/2014 | Sakamoto | ......... | H02M 3/33546 399/44 |

OTHER PUBLICATIONS

VSP—Modular 5 Channels Potentiostat/Galvanostat/EIS (2013). Retrieved from http://www.bio-logic.info/potentiostat/vsp.html.
VSP Potentiostat—Bio-logic Science Instruments (2013). Retrieved from http://www.bio-logic.net/en/products/potentiostat-galvanostat-eis/vsp-modular-5-channels-potentiostatgalvanostat/.

* cited by examiner

DATA ACQUISITION AND POWER CONTROL PROGRAMMABLE CUSTOMIZABLE COMBINATORIAL TESTING POWER SENSING AND DISPLAY INSTRUMENTATION

CROSS-REFERENCE TO RELATED APPLICATIONS

This application is a continuation-in-part application of a U.S. Non-Provisional Patent Application, "Data Acquisition and Power Control Programmable Customizable Combinatorial Testing Power Sensing and Display Instrumentation," which was filed on Jul. 23, 2014, and assigned U.S. application Ser. No. 14/339,134, which claims priority to provisional patent application entitled, "Data Acquisition and Power Control Programmable Customizable Combinatorial Testing Power Sensing and Display Instrumentation," filed on Jul. 23, 2013, and assigned U.S. Application No. 61/857,237; the entire contents of both, which are hereby incorporated by reference.

FIELD OF THE INVENTION

The present invention is generally related to data acquisition and power control unit. In particular, the present invention is directed to a data acquisition unit having a computer implemented programmable and controllable power supply component with a diverse flexible suite of sensing capabilities and special programs controlling measuring, recording and displaying of data from experiments aimed at observing new material behaviors, such as anomalous heat and meta-materials.

BACKGROUND OF THE INVENTION

The Data Acquisition and Power Control Unit will find wide applicability in corrosion, hull coating, meta-material, and anomalous heat experiments, recording and calibrating data in calorimetry experiments, electrode and sensor low-current exercising experiments, electroplating and analysis; and energy source or storage cycling, analysis and evaluation for land, sea and air platforms, regarding refueling, and maintenance requirements. Additionally, the invention can be applied to training facilities for electrochemistry, thermodynamics, and electronics, by providing a controlled voltage to an object under examination, based on a desired control mode of the user (constant or programmed voltage, current, or power).

Specifically, positive results have been confirmed in the emerging field of anomalous heat effects. Benefits from exemplary embodiments implemented in this research can be two-fold. First, the simplicity in the power supply circuitry can allow easier and more definitive analysis of the resulting data. Secondly, the small, integrated instrumentation size and low cost of the exemplary embodiments disclosed herein can enable much needed combinatorial testing. Combinatorial testing can enable rapid understanding or optimization of phenomena in the subject areas of electrochemistry, thermodynamics, and electronics.

In the prior art, conventional instruments, such as the Biologic VSP® potentiostat/galvanostat, is a model in the series of devices that have been designed for electrochemistry power controlling and data acquisition. The VSP has been refined to excel at electrochemistry, i.e., to be able to provide extremely accurate resolution in power input with up to one amp (or more with add on units). However, the VSP's precision results in a complex instrument that does not allow easy analysis of new phenomena that occur within materials (e.g., meta-materials, anomalous heat). The intricate internals of the VSP prevent easily anticipating why a material responds as it does. That is, when there is electronic feedback between the power supply and the experiment, it is difficult to separate out the power supply interaction from the true material property. Additionally, the VSP provides precise input power control and tracking but less precise auxiliary analog data ports (only two 16-bit inputs allowed). These inputs are not preprogrammed to read temperature values or thermoelectric module readings. This limits the expandability for further data integration. The VSP also wields a large size and price, which limits the use of such an instrument in small spaces or integrated into mobile platforms of small size and having weight restrictions (e.g., combinatorial testing) for portability (for use in platforms such as unmanned aerial vehicles UAVs).

Other devices, such as the Omega OMB-DAQ-2408 (multifunction data acquisition system), can measure, record data, and transmit an analog voltage signal of low current (5 mA). However, they are not able to drive higher current outputs or voltage without hardware and software development by the user. The Omega unit is not integrated with a program ready to perform temperature or thermoelectric module recordings and conversions and display data.

FIG. 1 illustrates a block diagram 100 of a prior art approach to a data acquisition and power supply system 100. Specifically, there are typically two categories of designs available today that include: (1) preprogrammed data acquisition (DAQ) 105 with no power output capability; and (2) advanced supply power units 110 for electrochemistry that are large (cubic feet), costly (several thousand dollars), complex, and not integrated with sensors. The second category, specifically such as a Bio-Logic electrochemical instrument, can cause constrained and complicated interpretation of experimental results. The cost and size of the power supply units 110 also can limit users' ability to perform combinatorial testing.

Accordingly, there remains a need in the art for a combined power supply module and data acquisition module that can overcome the limitations of the prior art designs.

SUMMARY OF THE INVENTION

According to one aspect of the invention, a power supply and data acquisition system can include a power supply component configured to provide a selectable, variable power output to an experiment, wherein the experiment comprises one or more sensors. A sensor interface unit can be configured to read a plurality of sensor inputs from the one or more sensors of the experiment. A microcontroller module can be configured to provide instructions to the power supply component, and further configured to receive the plurality of sensor inputs from the sensor interface unit and convert the sensor inputs into readable data.

According to another aspect of the invention, a method is described for receiving instructions from a user regarding experiment variables with a graphical user interface module, and communicating the experiment variable instructions to a microcontroller module. The microcontroller module can provide instructions from to a power supply component to provide real-time control of power, voltage and current to an experiment, wherein the experiment comprises one or more sensors. A plurality of sensor readings can be received from the one or more sensors of the experiment at the microcontroller module. The microcontroller modules can then convert the plurality of sensor readings into readable data.

These and other aspects, objects, and features of the present invention will become apparent from the following detailed description of the exemplary embodiments, read in conjunction with, and reference to, the accompanying drawings.

DETAILED DESCRIPTION OF EXEMPLARY EMBODIMENTS

Figure 1:
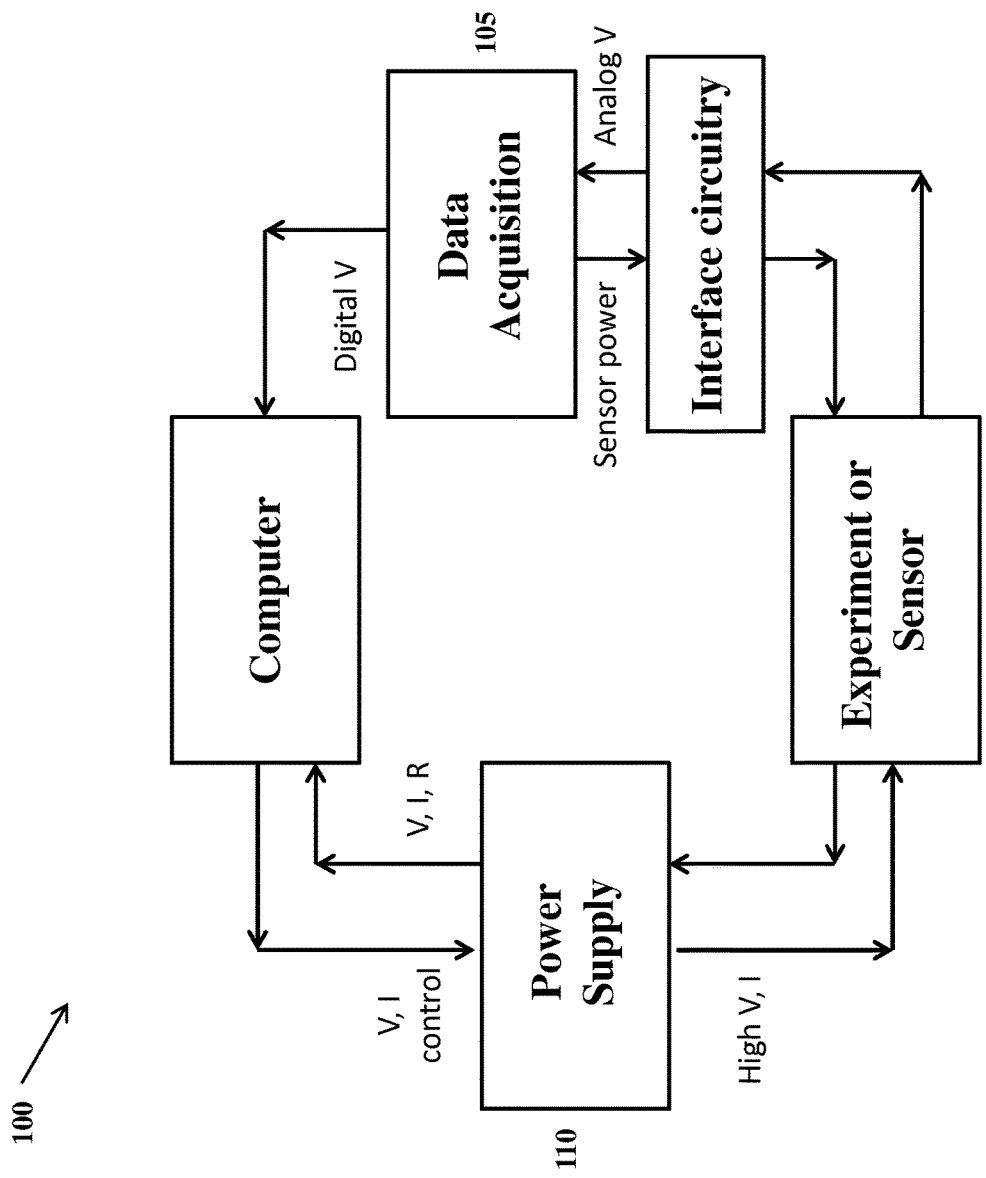
FIG. 1 illustrates a block diagram of a prior art approach to data acquisition and power supply systems.
Figure 2:
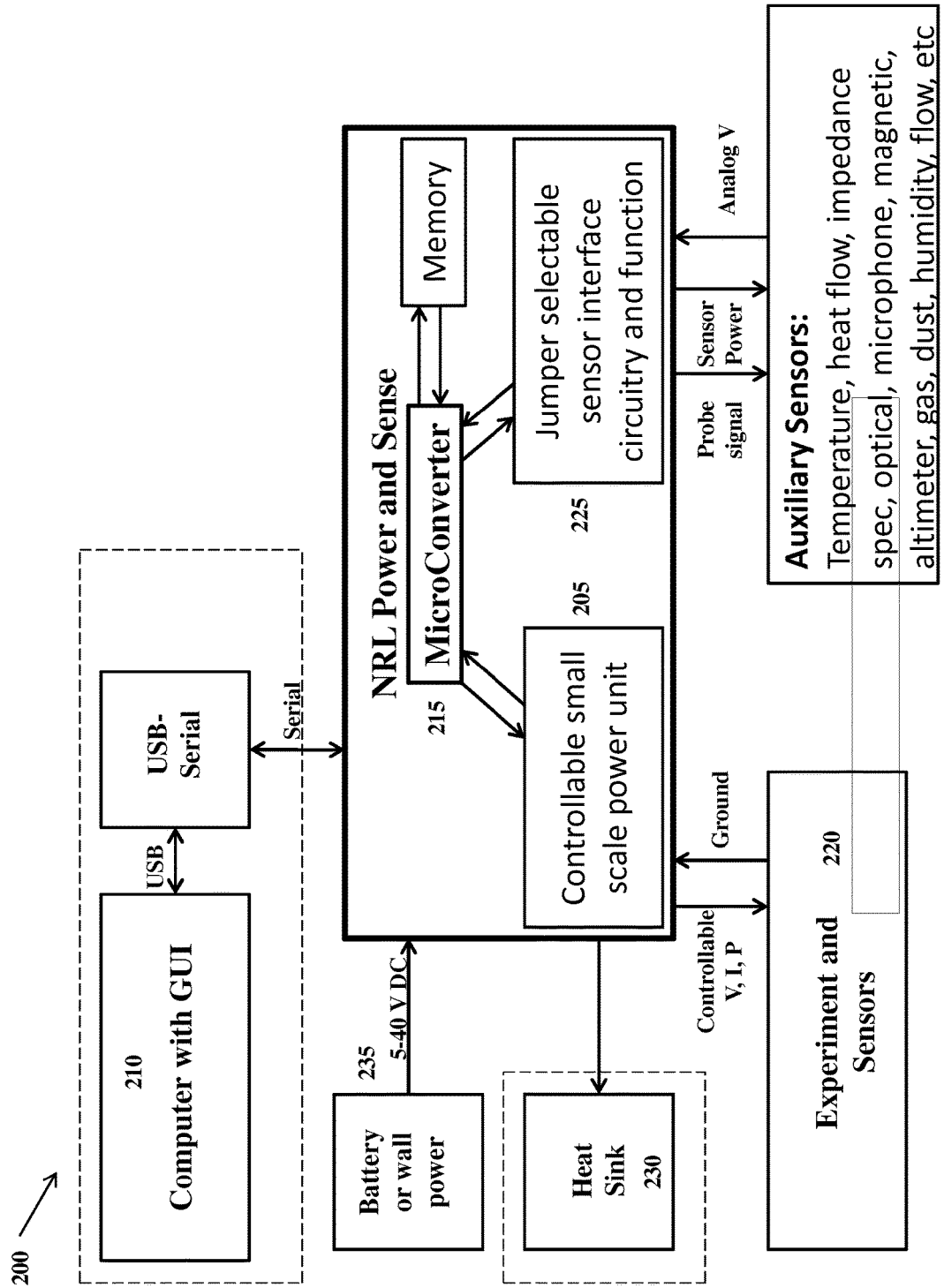
FIG. 2 illustrates a block diagram of a data acquisition and power supply system, in accordance with an exemplary embodiment of the invention.

FIG. 2 illustrates a block diagram of a data acquisition and power supply system 200, in accordance with an exemplary embodiment of the invention. In general, the system 200 can overcome the limitations of the prior art systems, and combine useful functionality between the power supply component 205 and data acquisition component, or sensor interface component, 225. Additionally, the power 205 and data acquisition 225 components can be divorced from the microcontroller 215 and computer 210 communications for some time and then later plugged into the computer 210 again.

In general, the exemplary embodiments of the data acquisition and power supply system 200 can include a Printed Circuit Board PCB, which integrates into a portable package with user-friendly connections, for anomalous heat research. Additionally, specific areas of research that strongly benefit from the exemplary embodiments disclosed herein include testing of the anomalous heat effect and meta-materials. Furthermore, the system 200 can include low cost, small size, and user-friendly interfaces for use in laboratory settings of educational institutes. In addition, it is noted that a need exists for products, such as disclosed in the exemplary embodiments to satisfy power and sensor uses in numerous robotic applications. Additionally, physics researchers typically desire pre-programmed (such as computer implemented, programmable) instrumentation as disclosed in the exemplary embodiment's power and sensing abilities to enable quicker experimental setup and operation. Therefore, instructors can use the exemplary embodiments disclosed herein for training on heat transfer, calorimetry, electrochemistry, and corrosion studies.

More specifically, this disclosure describes data acquisition and power control instrumentation that controls, measures, records, analyzes, processes, and displays data from experiments run with or without a computer 215. Exemplary embodiments describe the control of power passed into a power supply component 205 to provide variable power, current, and voltage to an experiment that can contain multiple sensors, and measurements of input and output parameters of an experiment studying meta-materials or anomalous material effects (e.g., excess heat).

The design can consist of multiple components. First, a graphical user interface (GUI) module can be implemented in a software module, or program, such as LabVIEW, on a computer 210 to gather, display, and record data as well as receive instructions from a user to control the power sent to the power supply component 205. In addition, a user can provide instructions to the graphical user interface module regarding experiment variables, such as instructions regarding power, voltage, and current requirements of the experiment 220, as well as information about the multiple sensors that are part of the experiment 220, such as the number of sensors, the type of sensors, and the expected value of sensor readings.

The computer 210 can serially communicate with a microcontroller module, or MicroConverter chip, 215, such as an AduC847 chip, to provide the input instructions from the graphical user interface module in the computer 210. The microcontroller 215 can transmit a power control signal to the power supply component 205, which can be a variable voltage regulator, such as one or more LM3080 chips. The variable voltage regulator can take the control signal and set the power output accordingly. As noted, the power output can include information regarding variable power, current, and/or voltage information that can be sent to the experiment 220.

Finally, after an experiment 220 is powered, the experiment 220 can generate data that can be read by one or more sensors. The sensors can include temperature, heat flow, impedance spectroscopy, optical, microphone, magnetic, altimeter, gas, dust, humidity, and flow sensors; however, one of ordinary skill in the art will recognize there are numerous other sensors that could be utilized. A sensor interface unit 225 can be configured to read a plurality of sensor inputs from the one or more sensors of the experiment 220. Typically, auxiliary sensor information is read as an analog voltage value; however, digital information, such as from an impedance spectroscopy can also be read. The microcontroller 215 can then collect the sensor input readings from the sensor interface unit 225 and convert the sensor inputs into readable data. For example, the microcontroller 215 could interpret a particular analog voltage reading from a temperature sensor and convert that reading to an actual temperature value. Finally, the microcontroller 215 can transmit that information to the computer 210 to be read and processed by a user.

Additional hardware considerations can include the issue of heat management and how heat sinks 230 can be designed to maximize the output power for a wide input of wall or battery power 235. These heat management reservoirs 230 can allow optimization of the power output, or power input, based on the amount of heat being dissipated, which is the difference in power in verses power out to the experiment or sensor 220. It is not efficient using a linear drop out regulator, as disclosed herein, but very accurate in power output. A different type of power supply can be more efficient (switching regulated power supply), but one of ordinary skill in the art will understand and that such a power supply is inherently bigger and noisier, i.e., introducing interference and artifact.

In an exemplary embodiment, a local function can be optimized for work performed in laboratories or academic settings, where a user can interact with a computer interface 210 to control live parameters of power and sense or view live data taken from an experiment or sensor 220. In another exemplary embodiment, a remote function can be optimized for distant operation in a small form factor, such as a USB stick size. This remote implementation can allow the power and sense application to take action with digital input/output (I/O) to control external features of the remote unit (such as unmanned aerial vehicles (UAV's) or robot swarming teams), or wirelessly communicate information to a central processing unit for decisions to be made.

Specific capabilities of the system 200 can include the following. The instrumentation can collect 24-bit data from multiple channels at 50 samples/second with a programmed 16-bit cyclic redundancy check in communications. The instrumentation can be tuned to accept thermistor (ambient and in cell), cell voltage/current (for regulating supply voltage and observing possible cell generated voltage or other electronic effects) and PELTIER voltage measurements (to determine thermal power output). The real-time control frequency, of selectable constant power, voltage, or current modes, can be at least once every second. The power supply can provide up to 17 volts with at least one amp of current. One of ordinary skill in the art will understand that certain technological capabilities can be improved over time with improved hardware or software updates and implementing those improved components would not change the general function of the disclosure.

The advantage of the exemplary embodiments over a prior art units is the simple all-in-one power control and data acquisition system, which can enable experimental results to be analyzed easier. If the user wants to infer what may be occurring in a meta-material or anomalous material behavior, this straightforward design can allow simple circuit analysis to be performed. One such exemplary embodiment includes the Low Drop Out regulator, serving as a power supply, which can eliminate confusion with switching power supplies. To enable cheaper and simpler performance, precise input power control like the prior art units (e.g., VSP) is not the goal, but precise measurements of the inputs and outputs is required and performed to enable accurate understanding of new material phenomena. Additionally, the ability to take calorimetric measurements is built into exemplary embodiments, which is not part of the prior art units.

The software modules can be embedded into exemplary embodiments, which can enable the user to set up a text message or email notification to be sent if an interesting phenomenon is occurring that may require user intervention or observation. Therefore, power control calculations can be moved electronically to the microcontroller 215 speeding up the response time to changes in the power control. By adding one or more power supplies to the system 200, or lowering the power supply voltage, the current output to the experiment 220 can potentially be more than doubled. At least two additional power control units can also be added using R2R ladders and op-amps to drive additional variable voltage regulators.

The novel aspects of exemplary embodiments include the unique combination and new application to wide sensor and/or experiment inputs presented herein, include: Sensing and powering circuitry system 200 including a (1) the Circuit board level scalable and controllable power supply 205; and (2) a microcontroller 215 which controls a board level power supply and converts analog to digital signals conditioned by tailored analog or digital front ends for a wide array of inputs (e.g., input sensors); (3) on board analog front end for wide array of sensor interfacing 225; and (4) one or more software modules configured to run (or download data), display, and store sensor or experimental data, whereby the unit integrates information and provides necessary custom controllable power to advanced sensors or experiments, where the software controlling the analog to digital conversion (ADC) enables use of fewer conversion circuit elements and/or components and that software is characterized as: causing the computer processor to automatically configure a variable adjustment of ADC speed to enhance PID settling time.

The operation of the microcontroller 215 can be described as an algorithm operation that includes at least the following steps: (1) Configures speed of chip, configures conversion speeds of analog data set to continuously convert data, performs time tracking and stamping of data, conditions interrupt features to allow LabVIEW computer to talk with the microcontroller chip; (2) reset clock of chip once told to start by computer; (3) scan through X channels (e.g., 10 in an exemplary embodiment of the disclosure) of inputs and convert analog front end (amplifiers, resistor networks etc) data to digital data; (4) communicate with digital front end and gather its data (impedance spectroscopy, etc) and (a) either gather data from numerous sensors for storage or transmission to computer or (b) maximize speed to enable Proportional-Integral-Derivative (PID) controller algorithm to find target output value of current, voltage, or power from the on-board power source; (5) establish interrupt flags that tell the microcontroller 215 new info from the computer 210 (reset clock, new values in power output, and handshake to confirm successful transmission and corrections and/or time stepping of new values in power output); (6) perform 8 bit cyclic redundancy check (CRC) to ensure data transmitted to computer is correct; and (7) send information that was stored to computer.

The one or more software modules can be implemented in a software program, such as LabVIEW. The LabVIEW code can provide a generic driver to enable the user to integrate units into multiple LabVIEW setups of software and hardware, and/or LabVIEW can provide a standalone program to control, capture data, display, and analyze data and power from the hardware interface, which reduces user set up time. The LabVIEW standalone program overview and interface can provide at least the following features: (1) tabbed menus for graphing choices; (2) sets hardware analog and digital front end gains (after changing them in hardware) in software to match hardware; (3) automatically stores notes and clears them every x (e.g., 10) seconds; (4) diagnostic tab shows raw data streaming and speed of Analog to Digital Conversion; (5) graphs of data with options to pause for manipulation; (6) ability to program time varying power, current, or voltage output from the on-board power supply; and (7) provide for the wide variety of experiments done—1 second, 10 s, 10 min average data taken.

Additionally, the LabVIEW code can provide instructions for the following operations to be executed on a microprocessor: (1) prompt user to provide data storage location; (2) command hardware to reset clock; (3) perform error tracking if communications are lost with hardware; (4) read in data from the microcontroller 215 serially, or can be read in on the fly or after a remote operation and connection to the computer 210; (5) parse data and performs cyclic redundancy checks (CRC); (6) convert scaled values to voltages from analog input; (7) scale voltages to account for analog front end signal conditioning (amplification, etc.); (8) convert time stamp to computer readable time stamp; (9) search for unsuccessful data transmission with the CRC and remove the unsuccessful data; (10) average 1 sec data and converts appropriately to units of measure from sensors (T, V, current, power) and power output from on-board power supply; (11) calculate resistance of experiment; (12) compare actual verses desired values of power output; (13) adjust power output with proportional-integral-derivative (PID) controller algorithm; (14) increases speed of microcontroller to hone into final value(s) of P, V, or I faster; (15)

when within the range of the microcontroller's finest scale, they system can stop adjusting and go back to analyzing slower and more accurately (24 bit for the exemplary embodiment); (16) write data to multiple timed files; and (17) graph data based on user choices.

Figure 3:
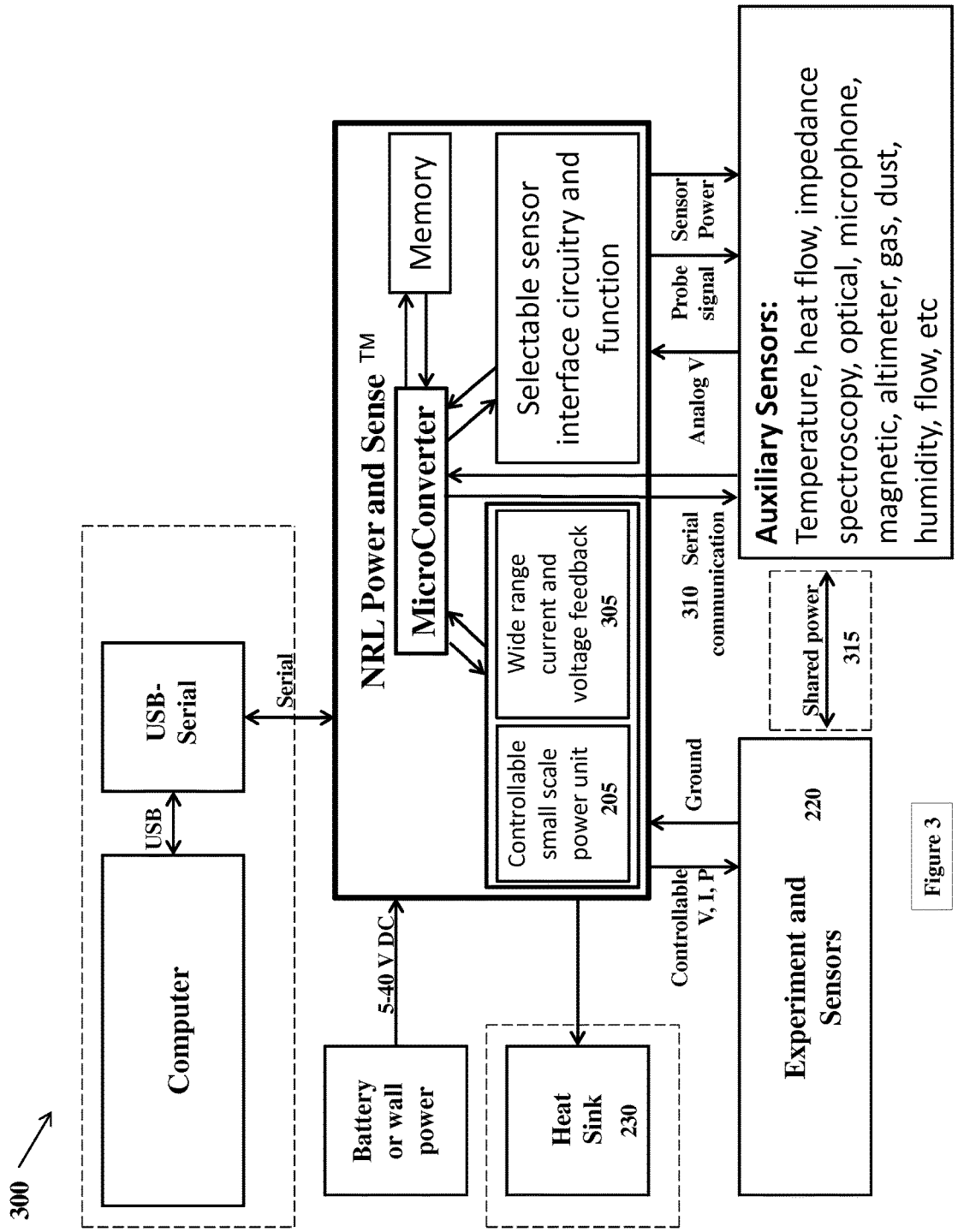
FIG. 3 illustrates a block diagram of a data acquisition and power supply system, in accordance with an alternative exemplary embodiment of the invention.

FIG. 3 illustrates a block diagram of a data acquisition and power supply system 300, in accordance with an alternative exemplary embodiment of the invention. In general, FIG. 3 adds a wide range current and voltage feedback component 305 as part of the power supply component 205. However, one of ordinary skill in the art will recognize that the general wide range I and V feedback are existent in FIG. 2; however, the operation between the two figures is different.

The crux of the issue is that the system requires a component to measure low and high currents, but having both is difficult. Using resistors to measure can lead to not high enough voltages being made (too low of R), or too much heat created (too high of R). Previous attempts at utilizing resistors did not succeed at low currents; and therefore, there was a low current region that would have errors in the current reading. In another attempt, a solution was to use an instrument amplifier and operational amplifier; however, this also failed at low currents due to common mode noise.

In an exemplary embodiment of the invention, another style of current monitoring, a Hall sensor can be utilized. This method can have more of a range in high and low currents. In one embodiment, the current feedback of the system would be determined by passing the output current through the Hall sensor, or monitor, and report a 0-5V range to the microcontroller, which could then scale V to a level of current. In another embodiment, a dual hi-low current monitor could be utilized. The Hall monitor is a capable solution as, at the lowest end, per the specification, the hall monitor signal is >5× that of the noise on the microcontroller ADC.

In an alternative exemplary embodiment of the invention, FIG. 3 depicts a serial communication line 310 to the sensors. This is especially relevant to the important application of impedance spectroscopy. Additionally, FIG. 3 depicts that some sensors may use the power from the output of the power supply component, a shared power 315.

In summary, the disclosure describes a computer implemented, programmable, customizable, combinatorial data acquisition and power control, testing, sensing and display instrumentation, having small size and low cost to control, measure, record, analyze, process, and display data from tests and/or experiments conducted with or without a computer. Such experiments include Lithium ion battery health, tests, robotic sensor exercising, electrochemistry experiments, corrosion and energy storage testing, as well as other tests aimed at observing new material behaviors, such as anomalous heat and meta-materials testing. The system can integrate both the power function and the sense function with hardware and software at the microcontroller and computer levels. Furthermore, the disclosure describes a computer implemented, programmable, customizable, combinatorial data acquisition and power control, testing, sensing and display instrumentation, having small size and low cost to provide real-time, instantaneous controlled voltage to an experimenter's object or sensor, based on desired control mode of the user (i.e., constant or programmed voltage, current, or power). Finally, the disclosure describes a customizable, combinatorial data acquisition and power control, testing, sensing and display instrumentation, having small size and low cost to capture voltage signals from diverse sensors in or near an experiment, and capable of subjecting the voltage signals to signal processing and analysis, and store and display the results (with a computer, or during or after connecting the power sense instrument to a computer).

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (processor-executed processes, assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations; such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

Portions of the invention can comprise a computer program that embodies the functions described herein. Furthermore, the modules described herein, such as the microcontroller module and graphical user interface module, can be implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an exemplary embodiment based on the flow charts and associated description in the application text. Therefore, disclosure of a particular set of program code instructions is not considered necessary for an adequate understanding of how to make and use the invention. The inventive functionality of the claimed computer implemented tool is explained herein in more detail read in conjunction with the figures illustrating the program flow.

It should be understood that the foregoing relates only to illustrative embodiments of the present invention, and that numerous changes may be made therein without departing from the scope and spirit of the invention as defined by the following claims.

The invention claimed is:

1. A controlled power supply system, comprising:
a power supply component comprising a low drop out regulator and configured to provide a selectable, variable power output to an experiment, wherein the experiment comprises two or more sensors selected from the group consisting of temperature, heat flow, impedance spectroscopy, optical, microphone, magnetic, altimeter, gas, dust, humidity, and flow sensors;

a sensor interface unit comprising jumper selectable sensor interface circuitry configured to read a plurality of sensor inputs from the one or more sensors of the experiment; and a microcontroller module configured to provide instructions to the power supply component, and further configured to receive the plurality of sensor inputs from the sensor interface unit and convert the sensor inputs into readable data, wherein the microcontroller module is implemented in a computer system that comprises instructions stored in a machine-readable medium and a processor that executes the instructions, wherein the power supply, sensor interface unit, and microcontroller are integrated together as a single unit;

wherein the microcontroller is configured to condition the plurality of sensor inputs by receiving and interpreting resistive inputs and scaling voltage inputs; and wherein the power supply component is configured to be controlled by a user in real-time such that the selectable, variable power output is controllable to provide any one of a constant or programmed voltage, a constant or programmed current, or a constant or programmed power.

2. The system of claim 1, wherein the selectable, variable power output provided by the power supply component comprises power, voltage and current control.

3. A method of supplying controlled power, comprising the steps of:

providing instructions from a microcontroller module to a power supply component that comprises a low drop out regulator to provide real-time control of power, voltage and current to an experiment, wherein the experiment comprises two or more sensors selected from the group consisting of temperature, heat flow, impedance spectroscopy, optical, microphone, magnetic, altimeter, gas, dust, humidity, and flow sensors;

receiving, at the microcontroller module, a plurality of sensor readings from the one or more sensors of the experiment via a sensor interface unit comprising jumper selectable sensor interface circuitry configured to read the one or more sensors;

conditioning the plurality of sensor inputs by receiving and interpreting resistive inputs and scaling voltage inputs;

converting the plurality of sensor readings into readable data with the microcontroller;

communicating experiment variable instructions to the microcontroller module; and providing power, voltage and current to the experiment from the power supply component, wherein the power supply, sensor interface unit, and microcontroller are integrated together as a single unit; and wherein the power supply component is configured to be controlled by a user in real-time to provide any one of a constant or programmed voltage, a constant or programmed current, or a constant or programmed power.

4. The method of claim 3, further comprising the step of:

receiving instructions from the user regarding experiment variables with a graphical user interface module.

5. The system of claim 1, wherein the selectable, variable power output is controlled at least once every second via a proportional-integral-derivative (PID) algorithm.

6. The system of claim 1, wherein the microcontroller module is tuned to accept temperature, heat flow, impedance spectroscopy, optical, microphone, magnetic, altimeter, gas, dust, humidity, and flow sensors.

7. The method of claim 3, wherein the selectable, variable power output is controlled at least once every second via a proportional-integral-derivative (PID) algorithm.

8. The method of claim 3, wherein the microcontroller module is tuned to temperature, heat flow, impedance spectroscopy, optical, microphone, magnetic, altimeter, gas, dust, humidity, and flow sensors.

* * * * *